(12) United States Patent
Poulin et al.

(10) Patent No.: US 6,612,176 B2
(45) Date of Patent: Sep. 2, 2003

(54) PRESSURE TRANSDUCER ASSEMBLY WITH THERMAL SHIELD

(75) Inventors: James M. Poulin, Derry, NH (US); Santhi E. Mathew, Londonderry, NH (US); Leonid Mindlin, South Natick, MA (US); Claudia J. Quigley, Lexington, MA (US); Stephen D. Blankenship, Melrose, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 09/750,428

(22) Filed: Dec. 28, 2000

(65) Prior Publication Data

US 2002/0083774 A1 Jul. 4, 2002

(51) Int. Cl.[7] ................................................ G01L 19/04
(52) U.S. Cl. ........................................................ 73/708
(58) Field of Search ........................... 73/718, 715, 724, 73/706, 714, 756; 361/283.1, 283.3, 283.4

(56) References Cited

U.S. PATENT DOCUMENTS

| | | | |
|---|---|---|---|
| 4,176,557 A | 12/1979 | Johnston | 73/708 |
| 4,850,227 A | 7/1989 | Luettgen et al. | 73/708 |
| 5,249,469 A * | 10/1993 | Jonsson et al. | 361/283.4 |
| 5,625,152 A * | 4/1997 | Pandorf et al. | 73/756 |
| 5,911,162 A * | 6/1999 | Denner | 361/283.4 |
| 6,029,525 A | 2/2000 | Grudzien | 73/718 |

OTHER PUBLICATIONS

Tecknit, EMI Shield Products, "Custom Strips", Page A–3.

Instrument Specialties, Product Design & Shielding Selection Guide, Fabricated UltraFlex Gaskets, p. 108.

Bal Sal Engineering Company, Inc. Santa Ana, California, BAL SEAL Canted Coil Spring Gaskets, pp. 3.2–2 and 3.2–14.

* cited by examiner

*Primary Examiner*—Hezron Williams
*Assistant Examiner*—Corey D. Mack
(74) *Attorney, Agent, or Firm*—Hale and Dorr LLP (57) ABSTRACT

A capacitive pressure transducer including a heater shell, a capacitive pressure sensor, an electronics assembly and a thermal barrier is presented. The sensor and the electronics assembly are disposed in the heater shell. The thermal barrier is also disposed in the heater shell and is disposed between the sensor and electronics assembly.

21 Claims, 7 Drawing Sheets

PRESSURE TRANSDUCER ASSEMBLY WITH THERMAL SHIELD

FIELD OF THE INVENTION

The present invention relates to capacitive pressure transducers. More particularly, the present invention relates to capacitive pressure transducers with improved thermal properties.

BACKGROUND OF THE INVENTION

Figure 1:
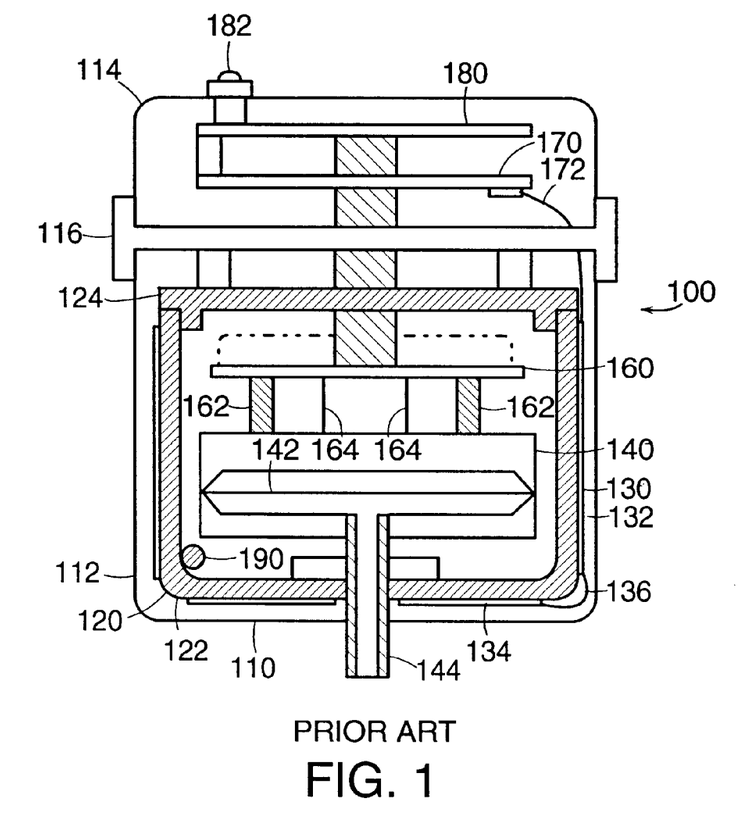
FIG. 1 shows a sectional view of a prior art heated capacitive pressure transducer.

FIG. 1 shows a sectional view of a prior art heated capacitive pressure transducer 100. Transducer 100 includes several major components such as an external shell 110, a heater shell 120, a heater 130, a capacitive pressure sensor 140, a front end electronics assembly 160, a heater control electronics assembly 170, and an input/output (I/O) electronics assembly 180. As will be discussed in greater detail below, transducer 100 generates an output signal indicative of a pressure measured by sensor 140.

For convenience of illustration, many mechanical details of transducer 100, such as the construction of sensor 140 and the mounting of sensor 140 and electronics assemblies 170, 180, have been omitted from FIG. 1. However, heated capacitive pressure transducers such as transducer 100 are well known and are described for example in U.S. Pat. Nos. 5,625,152 (Pandorf); 5,911,162 (Denner); and 6,029,525 (Grudzien).

Briefly, external shell 110 includes a lower enclosure 112, an upper electronics enclosure 114, and a joiner 116 that holds enclosures 112, 114 together. Heater shell 120 is disposed within the lower enclosure 112 and includes a lower enclosure or can 122 and a cover 124. Heater 130 includes a barrel heater 132 and an end heater 134. Barrel heater 132 is wrapped around the external cylindrical sidewall of can 122 and end heater 134 is disposed on the bottom of can 122. Barrel heater 132 and end heater 134 are electrically connected via wires 136 so the two heaters 132, 134 may be simultaneously controlled via a single electrical signal. Sensor 140 and front end electronics assembly 160 are disposed within heater shell 120. Mounting posts 162 support front end electronics assembly 160 over sensor 140 and wires 164 electrically connect front end electronics assembly 160 and sensor 140. Heater control electronics assembly 170 and I/O electronics assembly 180 are disposed within the upper electronics enclosure 114. A temperature sensor (e.g., a thermistor) 190 is fixed to an internal surface of heater shell 120.

Sensor 140 includes a metallic, flexible, diaphragm 142 and a pressure tube 144. Tube 144 extends from an area proximal to the diaphragm through the heater shell 120, and through the lower sensor enclosure 112. The lower, or external, end of tube 144 is generally coupled to a source of fluid (not shown). Pressure of fluid in the source is communicated via tube 144 to the lower surface of diaphragm 142 and the diaphragm 142 flexes up or down in response to changes in pressure within tube 144. Diaphragm 142 and a reference conductive plate of sensor 140 form a capacitor, and the capacitance of that capacitor varies in accordance with movement or flexion of the diaphragm. Accordingly, that capacitance is indicative of the pressure within tube 144. Front end electronics assembly 160 and I/O electronics assembly 180 cooperatively generate an output signal representative of the capacitance of sensor 140 which is, of course, also representative of the pressure within tube 144. I/O electronics assembly 180 makes that output signal available to the environment external to transducer 100 via an electronic connector 182.

Figure 2:
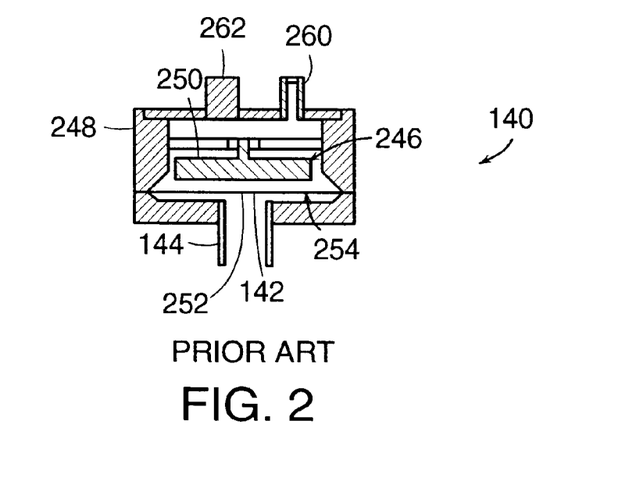
FIG. 2 shows a sectional view of a prior art capacitive pressure sensor.

FIG. 2 shows one example of how a capacitive pressure sensor 140 can be constructed. Capacitive pressure sensors of the type shown in FIG. 2 are discussed in greater detail in U.S. Pat. No. 6,029,525 (Grudzien). The sensor 140 shown in FIG. 2 includes a circular, conductive, metallic, flexible diaphragm 142, a pressure tube 144, and an electrode 246. Electrode 246 and diaphragm 142 are mounted within a housing 248. Electrode 246 includes a ceramic block 250 and a conductive plate 252. The ceramic block 250 is rigidly mounted to the housing 248 so that a bottom face of block 250 is generally parallel to, and spaced apart from, the diaphragm. The bottom face of block 250 is normally planar and circular. The conductive plate 252 is deposited onto the bottom face of block 250 and is also generally parallel to, and spaced apart from, the diaphragm. Conductive plate 252 and diaphragm 142 form two plates of a variable capacitor 254. The capacitance of capacitor 254 is determined in part by the gap, or spacing, between the diaphragm 142 and the conductive plate 252. Since the diaphragm flexes up and down (thereby changing the spacing between diaphragm 142 and conductive plate 252) in response to pressure changes in tube 144, the capacitance of capacitor 254 is indicative of the pressure within tube 144.

FIG. 2 shows only one of the many known ways of configuring a capacitive pressure sensor 140. However, capacitive pressure sensors 140 generally include one or more conductors that are held in spaced relation to a flexible, conductive, diaphragm. The diaphragm and the conductors form plates of one or more variable capacitors and the capacitance of those capacitors varies according to a function of the pressure in tube 144.

Capacitive pressure sensors often include additional features such as a tube 260 and a getter 262 as shown in FIG. 2. When sensor 140 is being constructed, tube 260 is initially open and is used to establish a reference pressure (e.g., vacuum) in the portion of housing 248 above diaphragm 142. Once the desired reference pressure is established (e.g., by attaching a vacuum pump to tube 260), the upper portion of tube 260 is closed, or "pinched off", so as to maintain the desired reference pressure inside the upper portion of housing 248. Getter 262 is often included to absorb gas molecules that get into the upper portion of housing 248 after tube 260 has been pinched off (e.g., via outgasing of electrode 250).

Returning to FIG. 1, in operation, front end electronics assembly 160 measures the capacitance (or capacitances) of sensor 140 and generates a voltage signal representative of that capacitance (e.g., the voltage signal may vary linearly with changes in capacitance). I/O electronics assembly 180 typically amplifies and further conditions that voltage signal to generate the output signal of transducer 100.

In high performance transducers, front end electronics assembly 160 must be capable of resolving very small changes in the capacitance of sensor 140 (e.g., in a sensor that measures pressures in the range of one Torr, a delta pressure of 0.1 Torr typically corresponds to a change of only two picofarads in the capacitance of sensor 140). Accordingly, it is important to minimize any stray capacitances associated with measurement of the capacitance of sensor 140. One method of minimizing these stray capacitances is to locate front end electronics assembly 160 closely to sensor 140 and thereby minimizing the length of the wires 164 that electrically connect assembly 160 and sensor 140.

Ideally, the output signal of transducer 100 varies only according to changes in the pressure of the fluid in tube 144.

However, changes in the temperature of transducer 100, or temperature gradients within transducer 100, can affect the output signal. This is primarily due to the different coefficients of thermal expansion of different materials used to construct the sensor 140. A secondary effect relates to the temperature sensitive performance of front end electronics 160. Accordingly, the accuracy of transducer 100 can be adversely affected by temperature changes in the ambient environment.

To minimize the adverse effect of changing ambient temperature, the temperature sensitive components of transducer 100 (i.e., sensor 140 and front end electronics 160) are disposed within heater shell 120, and in operation the heater 130 attempts to heat the heater shell 120 to a controlled, constant temperature. Heater 130 and heater shell 120 essentially form a temperature controlled oven that attempts to maintain the temperature of the temperature sensitive components at a constant preselected value.

The construction of heaters that may be used for heater 130 is well known. One preferred heater is described in copending U.S. patent application Ser. No. 09/685,154 (Attorney Docket No. MKS-78). Briefly, heater 130 is normally formed by placing wires or traces (e.g., copper) characterized by a selected electrical resistance onto a flexible, electrically insulating, thermally conductive shell. The traces are selected so that they will heat the heater shell 120 to a preselected temperature when a particular electrical signal is applied to the traces. The electrically insulating, thermally conductive shell is commonly made from thin layers of silicone rubber or Kapton (i.e., a polyimide high temperature film sold by Dupont under the trade name Kapton). Heater 130 is normally permanently bonded to the external surface of heater shell 120 as indicated in FIG. 1.

In operation, heater control electronics assembly 170 applies an electrical signal to heater 130 via wires 172. Heater control electronics assembly 170 normally includes components for monitoring the temperature of heater shell 120 via sensor 190 and adjusting the signal applied to heater 130 so as to maintain the shell 120 at a constant temperature.

Despite the use of heater shells 120 and heaters 130 as described above, capacitive sensor 140 is still often subjected to thermal gradients. For example, in operation the top of the sensor 140 may become slightly hotter than the bottom of the sensor. Such gradients adversely affect the performance of transducer 100. U.S. Pat. No. 5,625,152 (Pandorf) discloses one structure that tends to reduce the thermal gradients on the capacitive pressure sensor. The transducers disclosed in that patent include two heater shells that are separated from one another. The capacitive sensor is disposed on one of the heater shells and the electronics are disposed in the other heater shell. Each heater shell is equipped with its own heater and the two shells may be heated to different temperatures. One problem with this structure is that providing two separate heater shells disadvantageously increases the cost of the transducer. Another problem with this structure is that it tends to increase the distance between the sensor and the electronics thereby increasing the capacitance of the wires that connect them.

Accordingly, it would be advantageous to develop structures and methods for inexpensively reducing temperature gradients in capacitive pressure transducers.

SUMMARY OF THE INVENTION

These and other advantages are provided by a thermal barrier disposed inside the heater shell between the sensor and the front end electronics assembly. The thermal barrier effectively divides the heater shell into a lower portion and an upper portion, the sensor being disposed in the lower portion. The thermal barrier and the lower portion of the heater shell form an enclosure of uniform temperature that surrounds the sensor.

Heat flowing from the electronics assembly towards the sensor is intercepted by the thermal barrier and conducted to the heater shell thereby reducing thermal gradients on the sensor. Similarly, heat flow (e.g., caused by non-symmetric placement of heaters) from the bottom of the heater shell towards the top of the shell is received by the thermal barrier thereby reducing thermal gradients in the lower portion of the heater shell.

Still other objects and advantages of the present invention will become readily apparent to those skilled in the art from the following detailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE FIGURES

For a fuller understanding of the nature and objects of the present invention, reference should be made to the following detailed description taken in connection with the accompanying drawings in which the same reference numerals are used to indicate the same or similar parts wherein.

DETAILED DESCRIPTION OF THE PREFERRED EMBODIMENTS

Figure 3:
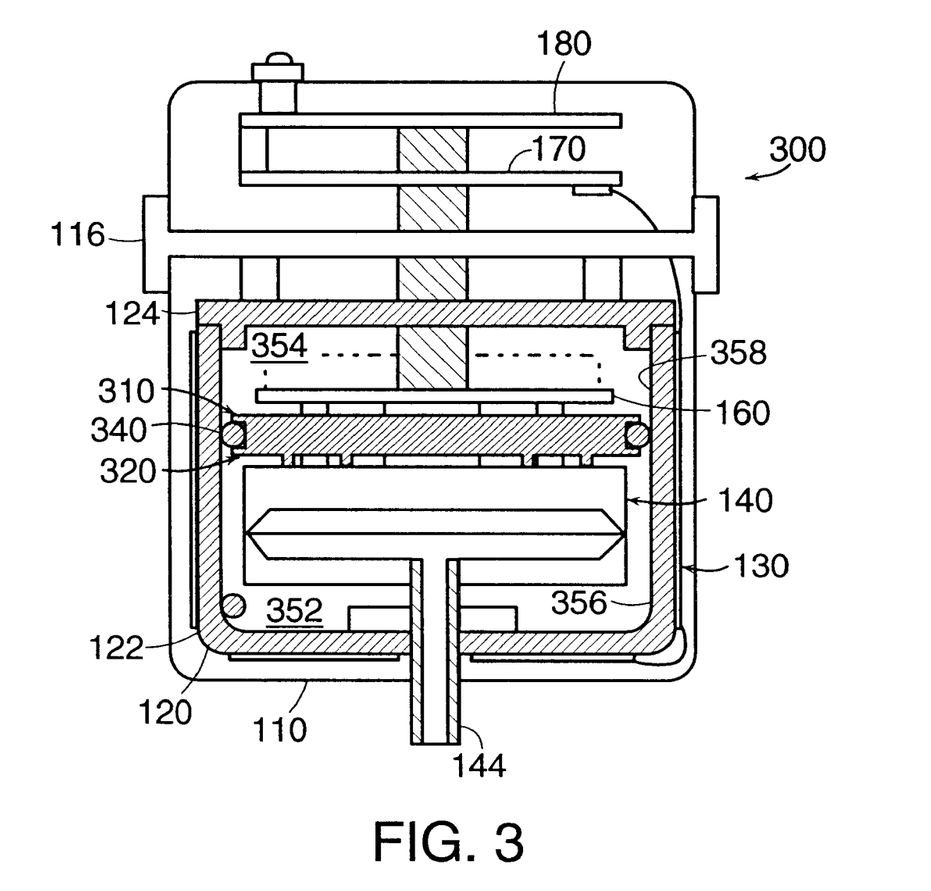
FIG. 3 shows a sectional view of a heated capacitive pressure transducer constructed according to the invention.

FIG. 3 shows a sectional view of a heated capacitive transducer 300 constructed according to the invention. Transducer 300 is similar to prior art transducer 100 (as shown in FIG. 1), however, transducer 300 additionally includes a thermal barrier 310 disposed between sensor 140 and front end electronics 160. Thermal barrier 310 improves the performance of transducer 300 by reducing thermal gradients on sensor 140 and by preserving the thermal stability of front end electronics 160.

Thermal barrier 310 includes a highly thermally conductive plate 320 and a highly thermally conductive spring 340. Spring 340 is disposed between, and makes mechanical and thermal contact with, the outer periphery of plate 320 and the inner wall of heater shell 120. Accordingly, thermal barrier 310 forms a thermally conductive wall that separates the interior of heater shell 120 into a lower enclosed volume 352 and an upper enclosed volume 354, the sensor 140 being disposed in the lower volume 352 and the front end electronics assembly 160 being disposed in the upper volume 354. The lower volume 352 is bounded by the thermal barrier 310 and by the portion 356 of the can 122 that is below the thermal barrier 310. The upper volume 354 is bounded by the thermal barrier 310, the cover 124, and by the portion 358 of the can 122 that is above the thermal barrier 310.

In operation of transducer 300, front end electronics assembly 160 is often the hottest component that is disposed within shell 120. This is because the electricity used in assembly 160 generates heat whereas the other components inside shell 120, such as sensor 140, are passive devices that do not generate heat. In prior art transducer 100, the heat generated by electronics assembly 160 could travel downwards and heat the top of sensor 140, thereby generating an unwanted thermal gradient across sensor 140 by making the top of sensor 140 hotter than the bottom of sensor 140. In contrast to the prior art, in transducer 300, heat produced by assembly 160 that propagates down towards sensor 140 (both by convection and radiation) is intercepted by thermal barrier 310 and conducted by thermal barrier 310 to the walls of can 122. This advantageously minimizes thermal gradients on sensor 140 and creates an enclosure of uniform temperature (formed by the lower portion 356 of can 122 and the thermal barrier 310) that surrounds the sensor 140.

Another source of temperature gradients on the sensor 140 of prior art transducer 100 relates to the placement of the heater 130. As shown in FIG. 1, the heaters 132, 134 are placed on the side walls and bottom of heater shell 120, but no heater is placed on the top of heater shell 120. Due to this heater configuration, the top of the heater shell can become cooler than the rest of the shell thereby establishing a temperature gradient in the heater shell 120. This gradient in turn can cause a temperature gradient to develop across the sensor 140 so that the bottom of the sensor 140 is hotter than the top.

Since transducer 300 uses the same configuration of heaters as is used in transducer 100, temperature gradients can develop in the heater shell 120 of transducer 300 (i.e., with the top 124 of the heater shell 120 being cooler than the bottom of the shell). However, in contrast to the prior art, in transducer 300 this gradient in the heater shell either does not generate a temperature gradient in sensor 140 or generates only a reduced temperature gradient in sensor 140. In transducer 300, heat traveling in the walls of the heater shell 120 from the bottom of can 122 to the cover 124 is received and conducted by thermal barrier 310. This has the effect of tending to confine any thermal gradients in heater shell 120 to the region above thermal barrier 310 and tending to eliminate or reduce any thermal gradients from the portion of heater shell 120 below thermal barrier 310.

In summary, regardless of the particular cause of a thermal imbalance in transducer 300, the presence of thermal barrier 310 effectively surrounds sensor 140 with an enclosure that is at a uniform temperature (the enclosure being formed by thermal barrier 310 and by the portion of heater shell 120 below barrier 310) and thereby advantageously reduces or eliminates thermal gradients from sensor 140.

Other advantages of thermal barrier 310 include (1) improving the temperature control of sensor 140 without necessitating an increase in the distance between the sensor 140 and front end electronics assembly 160 and (2) enclosing front end electronics assembly 160 in a temperature controlled environment (bounded by cover 124, thermal barrier 310, and the portion of can 122 above thermal barrier 310) and thereby reducing adverse affects caused by the temperature sensitive performance of assembly 160.

Figure 4A:
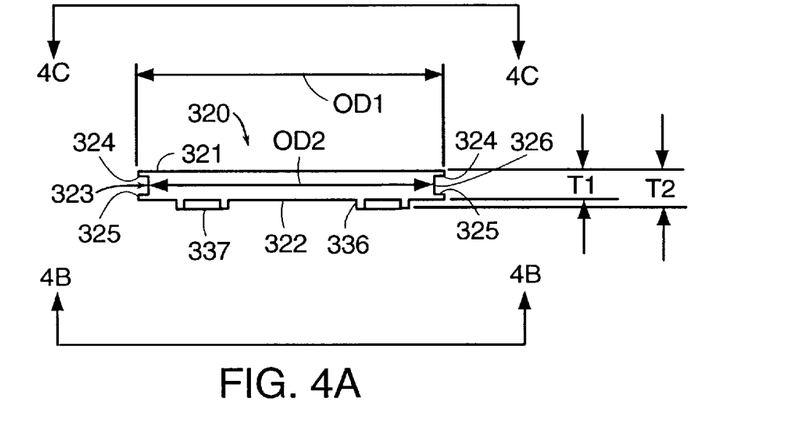
FIG. 4A shows a side view of a thermal plate constructed according to the invention.
Figure 4B:
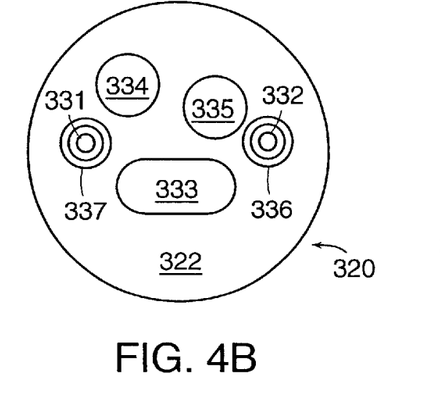
FIG. 4B shows a view of the bottom of the thermal plate taken in the direction of the line 4B—4B shown in FIG. 4A.
Figure 4C:
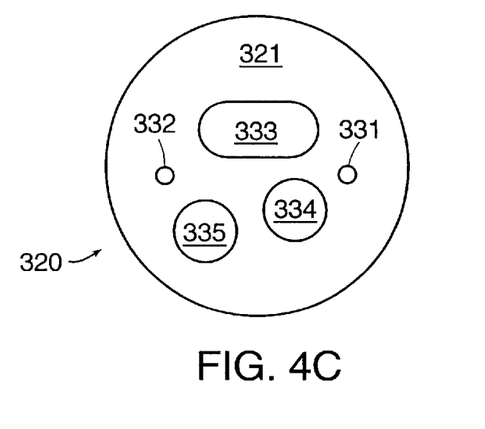
FIG. 4C shows a view of the top of the thermal plate taken in the direction of the line 4C—4C shown in FIG. 4A.
Figure 4D:
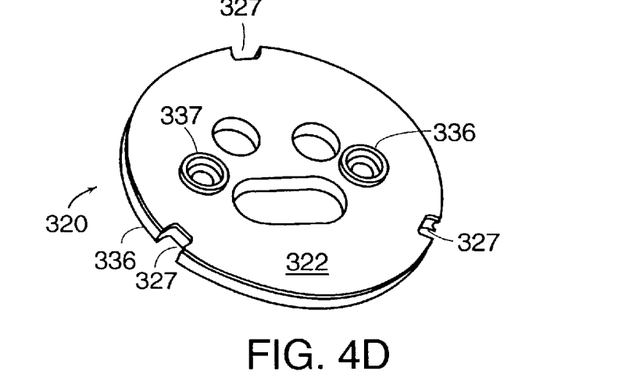
FIG. 4D shows a perspective view of another embodiment of a thermal plate constructed according to the invention.

FIG. 4A shows a side view of one embodiment of plate 320. FIG. 4B shows a view of the bottom of plate 320 taken in the direction of the line 4B—4B as shown in FIG. 4A. FIG. 4C shows a view of the top of plate 320 taken in the direction of the line 4C—4C as shown in FIG. 4A. FIG. 4D shows a perspective view of plate 320.

Plate 320 is generally disk shaped and defines a circular upper face 321 and a circular lower face 322. As shown best in FIGS. 4C and 4D, plate 320 defines five apertures 331, 332, 333, 334, 335, all of which extend through plate 320 from the upper face 321 to the lower face 322. When plate 320 is installed in transducer 300, two mounting posts 162 extend through apertures 331, 332. These mounting posts 162 hold electronics assembly 160 in fixed relation to sensor 140. Also, when plate 320 is installed in transducer 300, electrical wires, or feedthroughs, 164 extend through aperture 333. These wires 164 electrically connect sensor 140 to assembly 160. Having the wires 164 extend through aperture 333 electrically insulates them from plate 320. Apertures 334, 335 are provided in plate 320 to accommodate other features that are commonly present in sensor 140 such as the tube 260 and getter 262 as shown in FIG. 2.

Plate 320 additionally defines two cylindrical bosses 336, 337 that extend downwardly from lower face 322. Boss 336 is disposed around the periphery of aperture 332 and boss 337 is disposed around the periphery of aperture 331. When plate 320 is installed in transducer 300, the bottom of bosses 333, 337 rest on the upper surface of sensor 140. Bosses 336, 337 preferably provide an alignment, or locating, function. That is, in preferred embodiments of transducer 300, bosses 336, 337 fit over two projections (not shown) provided in the upper surface of sensor 140. When the plate 330 is aligned so that the bosses 336, 337 fit over the projections, then the apertures in plate 330 are also aligned with the mounting posts, wires, and other features that extend through the apertures. Bosses 336, 337 also separate (or space apart) the plate 330 and the sensor 140 so that an air space is provided between sensor 140 and the majority of plate 330. Bosses 336, 337 thereby reduce the surface area of contact between plate 330 and sensor 140.

As shown in FIG. 4A, in addition to upper face 321 and lower face 322, plate 320 also defines a sidewall 323 that extends around the outer periphery of plate 320. Sidewall 323 defines a recess 326 between the upper and lower faces 321, 322. Due to the presence of this recess, the outer diameter OD1 of plate 320 at the upper and lower faces 321, 322 is greater than the outer diameter OD2 of plate 320 at a point between the upper and lower faces 321, 322.

In one preferred embodiment, OD1 is substantially equal to 2.185 inches; OD2 is substantially equal to 2.085 inches; the thickness T1 of plate 320 between the upper and lower faces 321, 322 is substantially equal to 0.190 inches; and the thickness T2 of plate between the upper face 321 and the lower end of the bosses 336, 337 is substantially equal to 0.265 inches. Preferred materials for constructing plate 320 and heater shell 120 are highly thermally conductive materials such as aluminum.

In the embodiment illustrated in FIG. 4D, plate 320 additionally defines three apertures, or notches, 327 disposed around the outer periphery of the plate 320. Although notches 327 may be included to provide additional locating features, preferred embodiments of plate 320 do not include notches 327. Aside from the inclusion of notches 327, FIG. 4D shows a more accurate depiction of the preferred embodiment of plate 320 than do FIGS. 4A–C. Specifically, FIG. 4D shows preferred locations of the five apertures 331–335 and the two bosses 336, 337 more precisely than do FIGS. 4A–4C.

As shown in FIG. 3, when transducer 300 is assembled, spring 340 is disposed between heater shell 120 and plate 320. More specifically, spring 340 rests in the recess 326 defined in the sidewall 323 of plate 320.

Figure 5A:
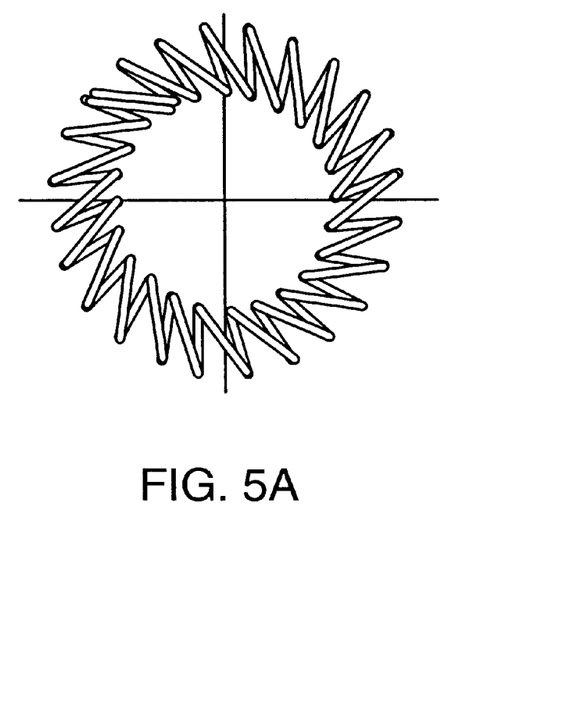
FIGS. 5A and 5B show front and side views, respectively, of a thermal spring constructed according to the invention.
Figure 5B:
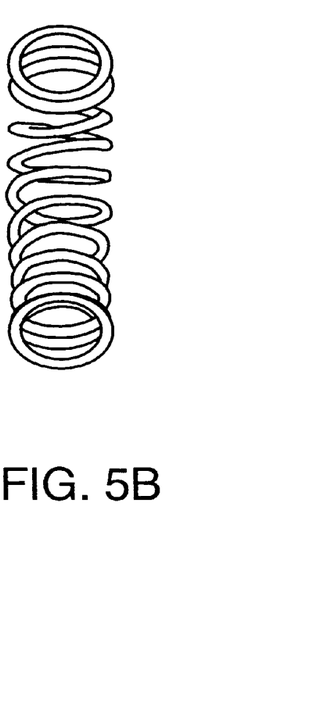
Figure 5C:
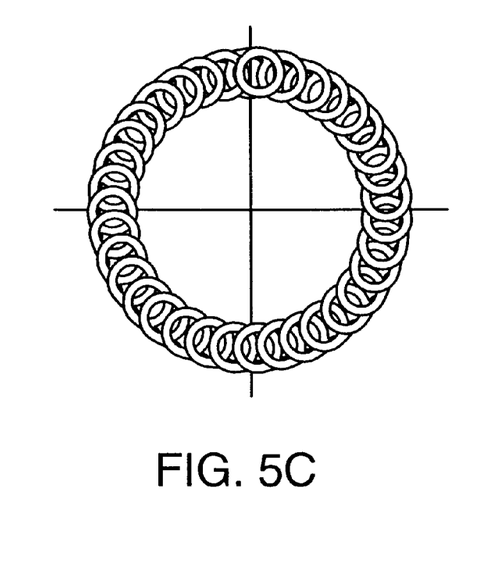
FIGS. 5C and 5D show front and side views, respectively, of another embodiment of a thermal spring constructed according to the invention.
Figure 5D:
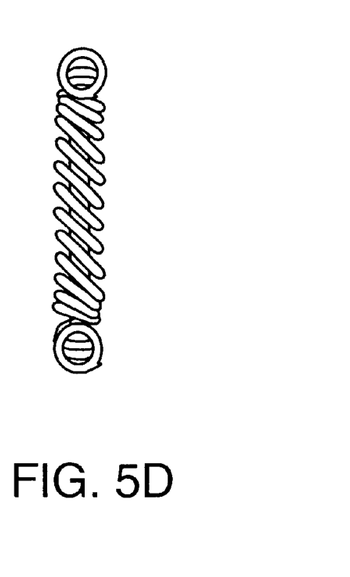

Spring 340 is preferably fabricated from a highly thermally conductive material and provides thermal contact between the can 122 of heater enclosure 120 and plate 320. One choice for implementing spring 340 is to use a coiled wire. FIGS. 5A and 5B show front and side views, respectively, of one coiled wire embodiment of spring 340. FIGS. 5C and 5D show front and side views, respectively, of another coiled wire embodiment of spring 340. Springs of the type illustrated in FIGS. 5A–5D are commercially available from Bal Seal Engineering Company, Inc. of Santa Ana, Calif. As an alternative to coiled wire, spring 340 may be implemented using a metallic mesh that extends around an elastomeric core. Such springs are commercially available for example from Tecknit USA of Cranford, N.J.

Spring 340 preferably provides two functions. First, it provides good thermal conductivity between heater enclosure 120 and plate 320. Accordingly, spring 340 is preferably fabricated from a good thermal conductor (e.g., copper or a highly thermally conductive alloy). Second, spring 340 provides a relatively weak spring force between the interior of heater shell 120 and the sidewall 323 of plate 320. The spring force provided by spring 340 should be sufficiently strong to prevent movement of plate 320 within transducer 300 when the thermal barrier 310 is mounted within heater shell 120. The spring force provided by spring 340 should also be sufficiently weak to prevent spring 340 from applying significant mechanical stress to heater enclosure 120. Preferred choices for the spring force provided by spring 340 when thermal barrier 310 is installed in transducer 300 are in the range of two to fifteen grams per inch circumference (i.e., two to fifteen grams for every inch of circumference). It will be appreciated that spring 340 may be implemented using other structures than coiled wire or metallic mesh surrounding an elastomeric core so long as the spring 340 provides the desired amount of thermal conductivity and the desired spring force.

In the embodiment illustrated in FIG. 4A, sidewall 323 includes a projection 324 at the upper face 321 and a projection 325 at the lower face 322 and the recess 326 is defined between the projections 324, 325. It will be appreciated that recess 326 merely provides a convenient place for locating spring 340, or for trapping spring 340 between the plate 320 and the heater shell 120. Accordingly, recess 326 could be shaped in a variety of ways and plate 320 need not include projections 324, 325 as shown in FIG. 4A. For example, in another embodiment, sidewall 323 could be generally C shaped.

Figure 6A:
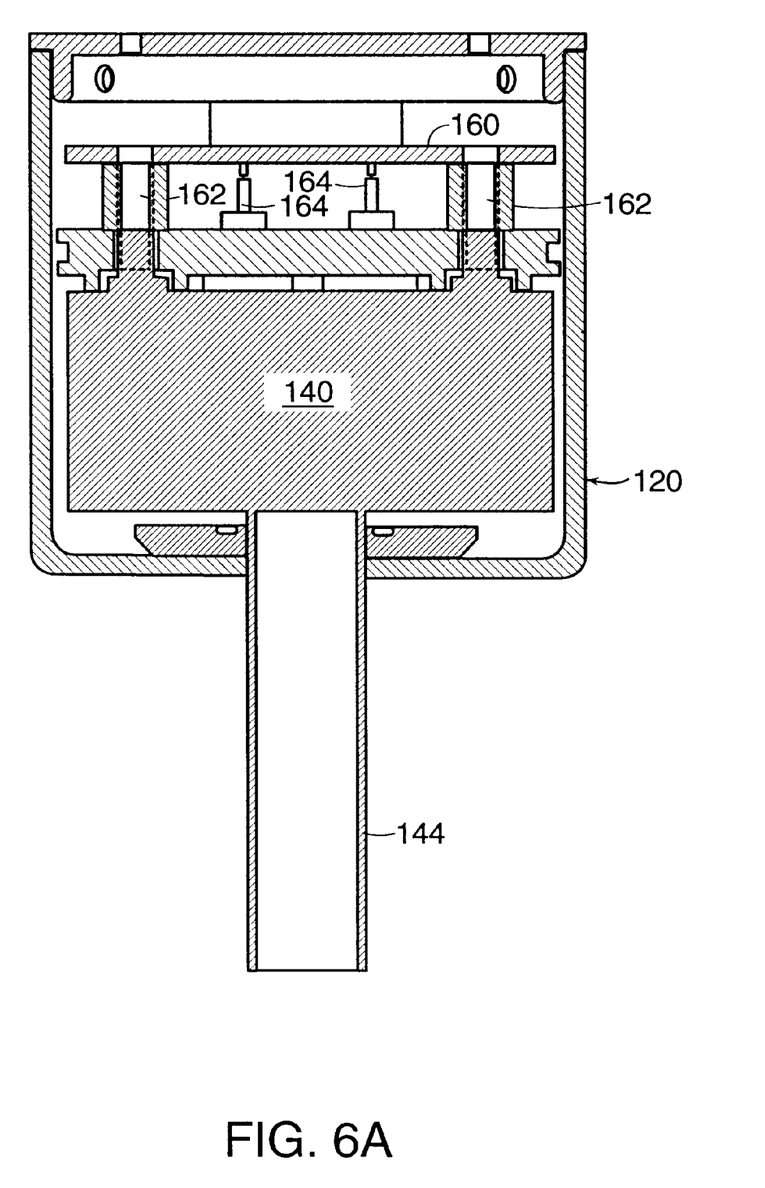
FIGS. 6A and 6B show sectional views of a portion of a preferred embodiment of a heated capacitive pressure transducer constructed according to the invention.
Figure 6B:
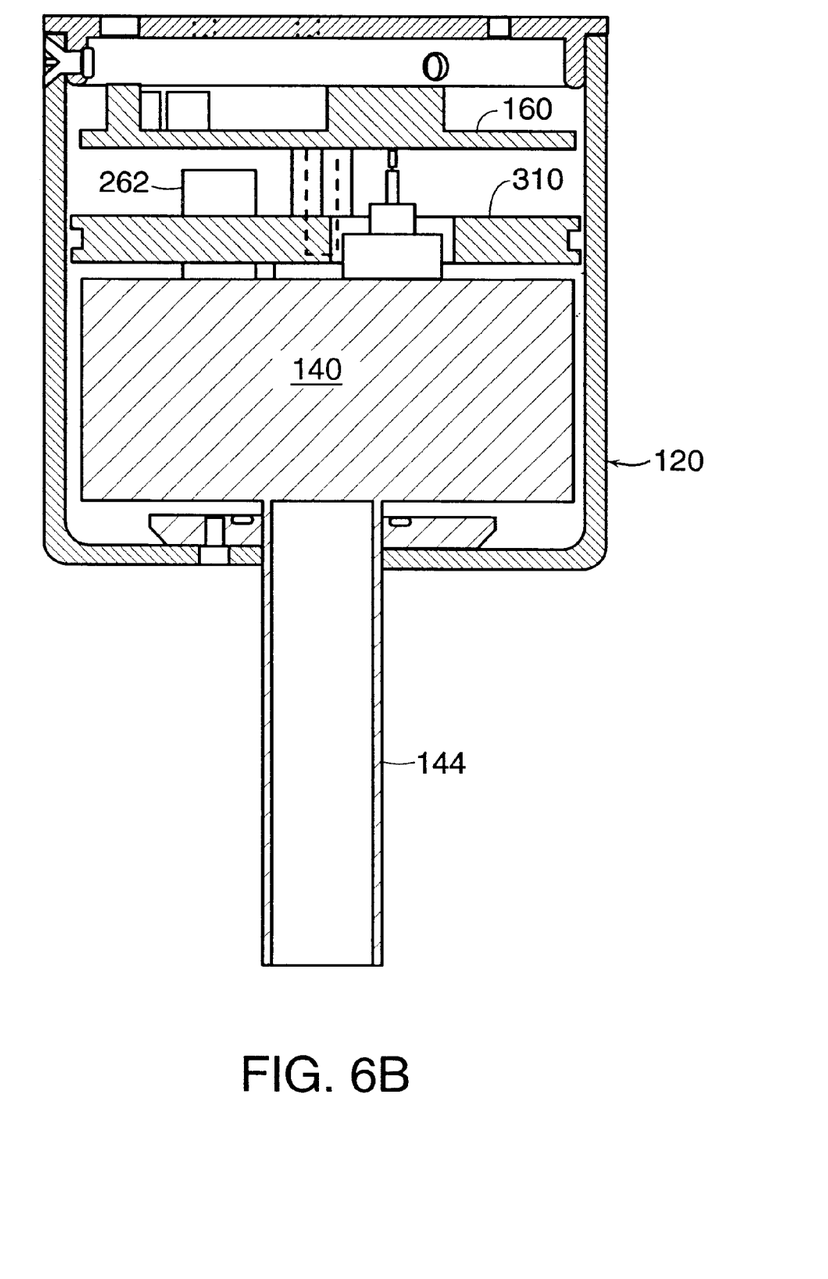

FIGS. 6A and 6B show two sectional views of a preferred embodiment of a portion of transducer 300. More specifically, FIGS. 6A and 6B show pressure tube 144, heater shell 120, and components disposed within the heater shell 120. For clarity, components external to heater shell 120 (such as external shell 110) and spring 340 are not shown in FIGS. 6A and 6B.

Figure 7:
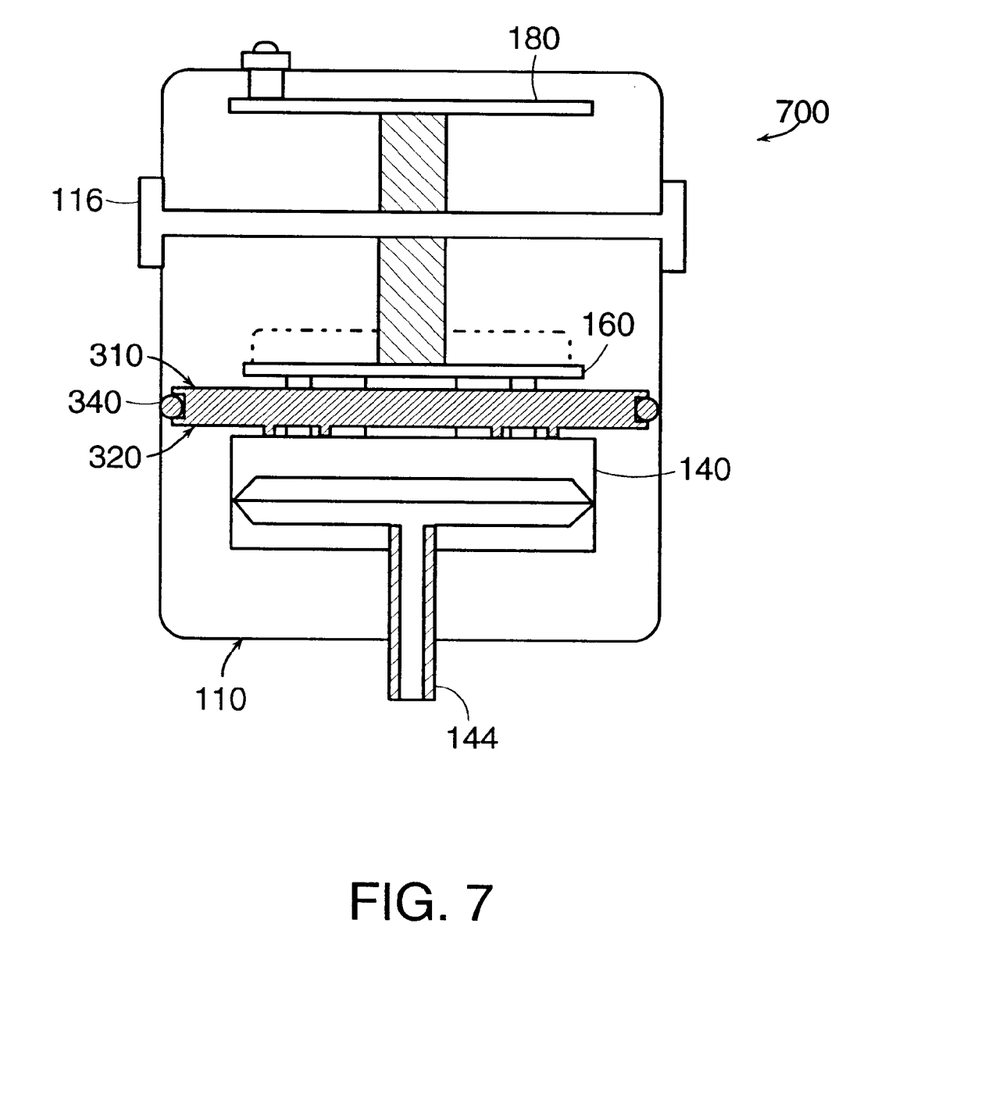
FIG. 7 shows a sectional view of an unheated capacitive pressure transducer constructed according to the invention.

FIG. 7 shows another embodiment of a capacitive pressure transducer 700 constructed according to the invention. Transducer 700 is an unheated unit. So, unlike transducer 300, transducer 700 does not include a heater shell 120 or a heater 130. However, aside from the absence of heater shell 120 and associated components, transducer 700 is similar to transducer 300.

As shown in FIG. 7, transducer 700 includes a thermal barrier 310 disposed between sensor 140 and front end electronics assembly 160. The dimensions of the thermal barrier 310 used in transducer 700 are somewhat different than for the thermal barrier used in transducer 300. More specifically, the outer diameter of the thermal barrier is preferably expanded so that the thermal barrier 310 contacts the external shell 110 of transducer 700.

Although transducer 700 is not heated, thermal barrier 310 provides a similar function as in transducer 300. For example, if thermal barrier 310 were not present in transducer 700, heat generated by electronics assembly 160 could heat the top of sensor 140 thereby generating a thermal gradient in sensor 140 and adversely affecting the performance of the transducer. However, in transducer 700, heat propagating from assembly 160 towards sensor 140 is intercepted by thermal barrier 310 and conducted away from sensor 140 and into the ambient environment via shell 110.

It will be appreciated that it is relatively easy to obtain the benefits of the invention. For example, thermal barrier 310 could be easily included in pressure transducer model numbers 627 and 622 which are commercially available from the assignee of the present invention.

It will further be appreciated that the invention embraces variations and alterations from the above described embodiments. For example, spring 340 may be eliminated from thermal barrier 310. In such springless embodiments, the dimensions of the plate 320 are preferably expanded so that the sidewall of the plate contacts or nearly contacts the heater shell or external enclosure of the transducer. Also, in such springless embodiments, plate 320 need not define notch 326. As another example, plate 320 has been described as being generally disk shaped (e.g., with circular top and bottom faces). However, the shape of plate 320 may readily be adapted for use in transducers using other geometries (e.g., square).

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A pressure transducer, comprising:
   (A) a thermally conductive heater shell;
   (B) a capacitive pressure sensor disposed in the shell, the sensor including a flexible diaphragm and a conductor, a capacitance between the diaphragm and conductor being indicative of a pressure on the diaphragm;
   (C) an electronics assembly disposed in the shell, the assembly being electrically connected to the sensor, the assembly generating a signal representative of the capacitance;

(D) a thermally conductive plate disposed in the heater shell, the plate being disposed between the sensor and the assembly; and (E) a thermally conductive spring disposed in the shell, the spring contacting an outer periphery of the plate and the shell.

2. A pressure transducer according to claim 1, the heater shell defining an interior volume, the plate and spring dividing the volume into an upper region and a lower region, the sensor being disposed in the lower region, the electronics assembly being disposed in the upper region.

3. A pressure transducer according to claim 1, the plate defining one or more apertures.

4. A pressure transducer according to claim 3, the transducer further including one or more wires for electrically connecting the sensor and the electronics assembly, the one or more wires extending through the one or more apertures.

5. A pressure transducer according to claim 1, wherein the plate comprises aluminum.

6. A pressure transducer according to claim 1, wherein the spring comprises a coiled wire.

7. A pressure transducer according to claim 1, wherein the spring comprises a wire mesh.

8. A pressure transducer according to claim 1, wherein the spring comprises copper.

9. A pressure transducer according to claim 1, further including a heater, the heater being fixed relative to the heater shell.

10. A pressure transducer according to claim 1, further comprising an outer shell enclosing the heater shell.

11. A pressure transducer, comprising:

(A) an enclosure;

(B) a capacitive pressure sensor disposed in the enclosure, the sensor including a flexible diaphragm and a conductor, a capacitance between the diaphragm and conductor being indicative of a pressure on the diaphragm;

(C) an electronics assembly disposed in the enclosure, the assembly being electrically connected to the sensor, the assembly generating a signal representative of the capacitance;

(D) a thermally conductive plate disposed in the enclosure, the plate being disposed between the sensor and the assembly; and (E) a thermally conductive spring disposed in the enclosure, the spring contacting an outer periphery of the plate and the enclosure.

12. A pressure transducer according to claim 11, further comprising an outer shell enclosing the enclosure.

13. A pressure transducer, comprising:

(A) an external shell;

(B) a thermally conductive shell disposed within the external shell;

(C) a heater coupled to the thermally conductive shell;

(D) a capacitive sensor disposed within the thermally conductive shell, the capacitive sensor including a flexible diaphragm and a conductor, a capacitance between the diaphragm and the conductor being indicative of a pressure on the diaphragm;

(E) an electronics assembly disposed within the thermally conductive shell, the electronics assembly being electrically connected to the capacitive sensor, the electronics assembly generating a signal representative of the capacitance;

(F) a thermally conductive plate disposed within the thermally conductive shell, the plate being disposed between the capacitive sensor and the electronics assembly; and (G) a thermally conductive spring disposed within the thermally conductive shell, the spring contacting an outer periphery of the plate and an inner periphery of the thermally conductive shell.

14. A pressure transducer according to claim 13, the thermally conductive shell defining an interior volume, the plate and spring dividing the interior volume into a first region and a second region, the capacitive sensor being disposed within the first region and the electronics assembly being disposed within the second region.

15. A pressure transducer according to claim 13, the plate defining one or more apertures.

16. A pressure transducer according to claim 15, the transducer further including one or more wires for electrically connecting the sensor and the electronics assembly, the one or more wires extending through the one or more apertures.

17. A pressure transducer according to claim 13, wherein the plate comprises aluminum.

18. A pressure transducer according to claim 13, wherein the spring comprises a coiled wire.

19. A pressure transducer according to claim 13, wherein the spring comprises a wire mesh.

20. A pressure transducer according to claim 13, wherein the spring comprises copper.

21. A pressure transducer according to claim 13, wherein the heater is fixed to an outer surface of the thermally conductive shell.

* * * * *